R. B. LEWIS.
SCORE INDICATOR.
APPLICATION FILED DEC. 1, 1910.

1,000,026.

Patented Aug. 8, 1911.

WITNESSES:

INVENTOR

BY

Attorney

UNITED STATES PATENT OFFICE.

ROBERT B. LEWIS, OF GREENFORD, OHIO.

SCORE-INDICATOR.

1,000,026. Specification of Letters Patent. Patented Aug. 8, 1911.

Application filed December 1, 1910. Serial No. 595,148.

*To all whom it may concern:*

Be it known that I, ROBERT B. LEWIS, a citizen of the United States, residing at Greenford, in the county of Mahoning and State of Ohio, have invented new and useful Improvements in Score-Indicators, of which the following is a specification.

My invention relates to score indicators or counters, and pertains more particularly to indicators for the use of base ball umpires for counting the balls and strikes and the number of "outs" or players retired.

The object of my invention is to produce an indicator of said class by which the operator may readily record the score and read the same by the sense of feeling as well as visually, whereby the necessity of diverting his eyes from the game is avoided.

A further object of my invention is to produce a plurality of disks rotatably mounted in a suitable case having suitable characters on the face thereof adapted to successively register with openings in the case, and provided with a series of groups of radial spurs on the periphery thereof and spaced thereon in such arrangement that a successive number will project beyond the edge of the case when each disk is turned a predetermined distance on its axis; and a still further object thereof is to provide a more simple, cheap and efficient article of said class than has heretofore been produced.

To these ends, my invention includes the combinations and arrangement of component parts to be hereinafter described and more particularly pointed out in the claims.

Figure 1:
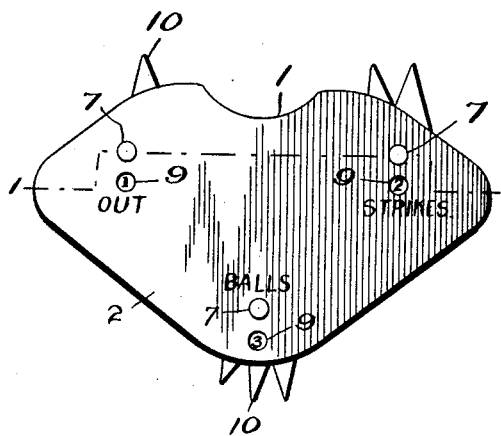
Figure 2:
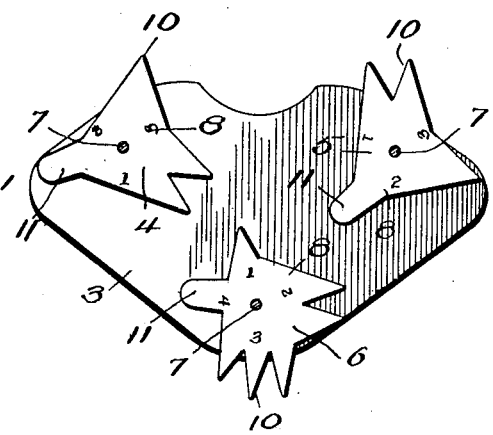
Figure 3:
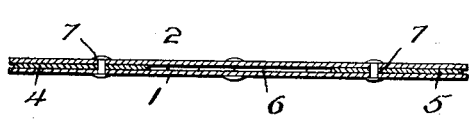
Figure 4:
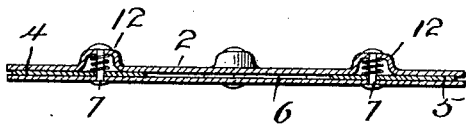
Figure 5:
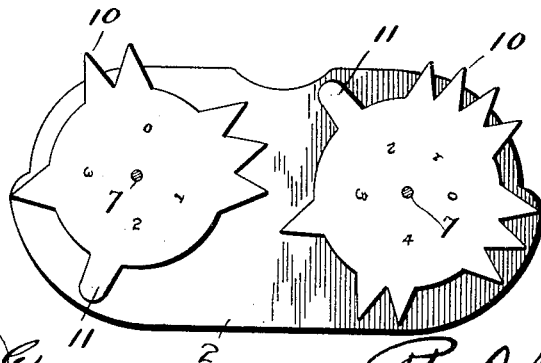

In the accompanying drawings illustrating my invention, in which like reference characters indicate similar parts, Figure 1 is a plan view of the front of my indicator; Fig. 2 is a similar view with the front plate of the case removed; Fig. 3 is a horizontal sectional view taken on the line 1—1 of Fig. 1, and Fig. 4 is a sectional view of a modified form of my invention showing means for holding the disks against accidental operation, and Fig. 5 is a modified form showing a different arrangement of the counter disks.

Referring to said drawings, 1 indicates a case comprising the front plate 2 and back plate 3, of corresponding shape, between which are pivotally journaled the disks 4, 5 and 6 on the pins 7, which pierce the plates 2 and 3 and are spread to rivet the plates together. On the face of each of said disks is marked a series of figures 8 which may be successively displayed through the openings 9 in the sides of the case 1 by rotating the disks as hereinafter described.

In order that the operator may read the indicator without looking at the characters described, I provide a series of radial spurs 10 on the periphery of each disk which project beyond the edge of the case, and may thus be readily counted by the touch of the hand. As shown in the drawings, said spurs are arranged in groups of successive numbers containing one, two or more according to their use, and such groups are spaced upon the disks in such manner that the number of spurs that are exposed correspond with the character that is displayed on the face of the disks when rotated on their pivots.

For the purpose of rotating each disk from a blank position, I provide a radial thumb or finger piece 11 by which it may be turned, which is so positioned that when it sinks within the case 1, the first spur projects above the case in position to be conveniently felt, and also to serve for readily pushing the disk forward to bring the next group of spurs and number into registering position.

It has been found that the frictional contact between the disks and the sides of the case 1 is usually sufficient to hold the disks in their adjusted positions, but when more positive force is required, a coiled spring 12 may be interposed around the journal pins 7 between the plate 2 and the disks, as shown in Fig. 4 of the drawings, or any other suitable means may be employed.

The construction and operation of my invention will be readily understood from the foregoing description and by reference to the accompanying drawings, and it will be appreciated that the parts and combinations thereof may be varied within a wide range from the specific exemplification shown without departing from the spirit and scope of the invention.

Having thus described my invention, what I claim as new and desire to secure by Letters Patent, is—

1. In a score indicator, the combination with a case comprising similarly shaped plates, of a disk pivotally journaled therein, a plurality of groups of radial spurs on the periphery of said disk, said groups being spaced at predetermined distances apart and adapted to project beyond and sink within the edge of the case as the disk is rotated, substantially as described.

2. A score indicator comprising a case formed of similarly shaped plates having openings therein, a plurality of disks pivotally journaled within said case, each disk having a series of characters on the face thereof adapted to be successively displayed through the openings in said case, a plurality of groups of radial spurs on the periphery of each disk spaced at predetermined distances apart adapted to successively project beyond the edge of the case and sink within the case as the disks are rotated, substantially as described.

In testimony whereof, I have hereunto signed my name to this specification in the presence of two subscribing witnesses.

ROBERT B. LEWIS.

Witnesses:
L. BERT NYE,
M. D. JUDD.

Copies of this patent may be obtained for five cents each, by addressing the "Commissioner of Patents, Washington, D. C."